(12) United States Patent
Hendaoui et al.

(10) Patent No.: US 8,908,253 B2
(45) Date of Patent: Dec. 9, 2014

(54) PASSIVELY VARIABLE EMITTANCE DEVICE AND METHOD FOR MAKING THE SAME

(71) Applicants: Institut National de la Recherche Scientifique (INRS), Quebec (CA); MPB Communications Inc., Pointe-Claire (CA)

(72) Inventors: Ali Hendaoui, Saint-Leonard (CA); Mohamed Chaker, Montreal (CA); Emile Haddad, Montreal (CA)

(73) Assignees: Institut National de la Recherche Scientifique (INRS), Quebec (CA); MPB Communications Inc., Pointe-Claire (CA)

( * ) Notice: Subject to any disclaimer, the term of this patent is extended or adjusted under 35 U.S.C. 154(b) by 0 days.

(21) Appl. No.: 14/084,167

(22) Filed: Nov. 19, 2013

(65) Prior Publication Data
US 2014/0139904 A1    May 22, 2014

Related U.S. Application Data

(60) Provisional application No. 61/728,028, filed on Nov. 19, 2012.

(51) Int. Cl.
*G02F 1/01* (2006.01)
*G02F 1/15* (2006.01)

(52) U.S. Cl.
USPC .......................................... 359/288; 359/265

(58) Field of Classification Search
USPC .................. 359/265–275, 285–289; 345/106; 250/505.1, 517.1, 330; 252/582, 583
See application file for complete search history.

(56) References Cited

U.S. PATENT DOCUMENTS 6,538,796 B1    3/2003  Swanson
6,899,170 B2    5/2005  Biter et al.
(Continued)

FOREIGN PATENT DOCUMENTS

WO    01/14498      3/2001
WO    02/082172    10/2002

OTHER PUBLICATIONS

M. Rycroft, et al., "Smaller satellites, bigger business? Concepts, applications and markets for micro/nanosatellites in a new information world" (Kluwer, Dordrecht, 2002), p. 1-2, Aug.

(Continued)

*Primary Examiner* — Mohammed Hasan
(74) *Attorney, Agent, or Firm* — McDonnell Boehnen Hulbert & Berghoff LLP (57) ABSTRACT

There is described a passive variable emittance device comprising: a substrate having a receiving surface adapted to reflect radiations having a given wavelength; an intermediary layer deposited on the receiving surface of the substrate and being substantially transparent to the radiations having the given wavelength; and a thermochromic layer deposited on top of the intermediary layer, the thermochromic layer being substantially transparent to the radiations having the given wavelength for a first temperature below a given transition temperature, and presenting both reflection and absorption for the radiations for a second temperature above the given transition temperature, a total optical thickness for the intermediary and thermochromic layers being substantially equal to one quarter of the given wavelength so that radiations reflected by the thermochromic layer at the second temperature destructively interfere with radiations transmitted by the thermochromic and intermediary layers and reflected by the substrate in order to obtain a first emittance for the passive variable emittance device at the second temperature being greater than a second emittance for the passive variable emittance device at the first temperature.

20 Claims, 8 Drawing Sheets

(56) References Cited

U.S. PATENT DOCUMENTS

| | | | |
|---|---|---|---|
| 7,761,053 | B2 | 7/2010 | Kruzelecky et al. |
| 8,422,113 | B2 * | 4/2013 | Moon et al. .................... 359/288 |
| 8,482,842 | B2 * | 7/2013 | Shim et al. .................... 359/288 |
| 8,576,473 | B2 * | 11/2013 | Shim et al. .................... 359/288 |
| 2004/0155154 | A1 | 8/2004 | Topping |

OTHER PUBLICATIONS

Osiander, R., et al., "Microelectromechanical Devices for Satellite Thermal Control", Sensors Journal, IEEE, vol. 4, No. 4, 525-531, Aug. 2004.

Biter, W., et al., "Electrostatic radiator for satellite temperature control," Aerospace Conference, IEEE, 781-790, Nov. 2005.

Pozo-Gonzalo, C., et al., "All-plastic electrochromic devices based on PEDOT as switchable optical attenuator in the near IR," Solar Energy Materials and Solar Cells, vol. 92, pp. 101-106, Nov. 2008.

H. Demiryont, "Emissivity-modulating electrochromic device for satellite thermal control", SPIE News-room, doi:10.1117/2.1200802.1011, Jun. 2008.

Y. Shimakawa, et al., A variable-emittance radiator based on a metal-insulator transition of (La,Sr)MnO3 thin films, Appl. Phys. Lett. 80, 4864, Jun. 24, 2002.

Suh, J. Y., et al., "Semiconductor to metal phase transition in the nucleation and growth of VO2 nanoparticles and thin films", Appl. Phys. Lett. 96, 1209, 2004.

Brassard, D., et al., "Grain size effect on the semiconductor-metal phase transition characteristics of magnetron-sputtered VO2 thin films", Appl. Phys. Lett. 87, 051910, Jul. 5, 2005.

Pauli, S. A., et al., "X-ray diffraction studies of the growth of vanadium dioxide nanoparticles", Appl. Phys. Lett. 102, 073527, Jun. 2007.

* cited by examiner

PASSIVELY VARIABLE EMITTANCE DEVICE AND METHOD FOR MAKING THE SAME

CROSS-REFERENCE TO RELATED APPLICATION

This application claims priority of U.S. Provisional Patent Application having Ser. No. 61/728,028, which was filed on Nov. 19, 2012 and is entitled "Passively Variable Emittance Device and Method for Making the Same", the specification of which is hereby incorporated by reference.

TECHNICAL FIELD

The present invention relates to the field of variable emittance devices, and more particularly to passively variable emittance devices.

BACKGROUND

Satellites in orbit encounter quite large temperature variations depending of their exposure to the solar energy. However, their internal temperature should be controlled to an optimal operating temperature range in order to keep all the electronic systems function under stabilized conditions.

Radiators are usually used for maintaining the internal temperature of a satellite within the optimal operating temperature range. The heat exchange between the radiator and its environment is mainly controlled through radiation, which is in turn determined by the radiator emittance. Therefore, the thermal control of the satellite internal temperature may be achieved via the use of a radiator having variable emittance surfaces. By adapting the emittance value to the external temperature, it is possible to radiate more or less heat so that a control of the temperature of the satellite is achieved.

There are mainly two types of radiators used for the thermal control systems of satellites, i.e. active and passive approaches. The active approach includes all the thermal management systems that are activated electrically. One example of an active radiator consists in an active thermal control system comprising electro-mechanical louvers formed of highly reflective metal blades which open and close depending on the external temperature to expose more or less area of an emissive surface. The control of the electro-mechanical louvers requires temperature sensors, power supply and control circuits, which makes them complex, expensive, and/or bulky.

A passive radiator is a passive variable emittance device comprising a coating having an emittance that can self-adjust with the temperature. For example, it has been reported in the prior art that coatings made of lanthanum-strontium-manganate may present a change in the emittance from 0.37 to 0.67 while the temperature increasing from 220K to 340K. However, the maximum emittance at high temperature, i.e. 0.67, may not be sufficient for evacuating heat.

Therefore, there is a need for an improved passive variable emittance device having applications in at least the field of satellites.

SUMMARY

According to a broad aspect, there is provided a passive variable emittance device comprising: a substrate having a receiving surface adapted to reflect radiations having a given wavelength; an intermediary layer deposited on the receiving surface of the substrate and being substantially transparent to the radiations having the given wavelength; and a thermochromic layer deposited on top of the intermediary layer, the thermochromic layer being substantially transparent to the radiations having the given wavelength for a first temperature below a given transition temperature, and presenting both reflection and absorption for the radiations for a second temperature above the given transition temperature, a total optical thickness for the intermediary and thermochromic layers being substantially equal to one quarter of the given wavelength so that radiations reflected by the thermochromic layer at the second temperature destructively interfere with radiations transmitted by the thermochromic and intermediary layers and reflected by the substrate in order to obtain a first emittance for the passive variable emittance device at the second temperature being greater than a second emittance for the passive variable emittance device at the first temperature.

In one embodiment, a physical thickness of the thermochromic layer is comprised between about 10 nm and about 80 nm.

In the same or another embodiment, a physical thickness of the intermediary layer is greater than about 1 μm.

In one embodiment, an optical thickness of the thermochromic layer is substantially negligible relative to an optical thickness of the intermediary layer, a physical thickness of the intermediary layer being substantially equal to one quarter of the given wavelength in the intermediary medium.

In one embodiment, the receiving surface of the substrate is adapted to reflect an infrared light, the intermediary layer is made of a material that is substantially transparent to the infrared light, and the thermochromic layer is made of a material that is substantially transparent to the infrared light, when in a semiconductor state, and that both reflects and absorbs the infrared light when in a metallic state.

In one embodiment, the receiving surface of the substrate is made of a material selected from a group consisting of: gold, aluminum, platinum, copper, silver, zinc, and alloys thereof.

In one embodiment, the intermediary layer is made of a material selected from a group consisting of: $SiO_2$, $Al_2O_3$, $MgO$, $Ta_2O_5$, $ZnO$, $ZrO_2$, $TiO_2$, $CaF_2$, $ThF_4$, $Si_3N_4$, Boron Silicate Crown glass BK7, ZnS, and ZnSe.

In one embodiment, the thermochromic layer is made of a material selected from a group consisting of: $VO_2$, $V_4O_7$, $V_6O_{11}$, $V_2O_3$, $V_5O_9$, $V_6O_{13}$, VO, $V_8O_{15}$, $V_2O_5$, $Fe_3O_4$, $NbO_2$, NiS, $Ti_2O_3$, $Ti_3O_5$, $Ti_4O_7$, $Ti_5O_9$, $SmNiO_3$, $LaCoO_3$, $NdNiO_3$, and $PrNiO_3$.

In one embodiment, the passive variable emittance device is adapted to be used as a radiator for a satellite.

In another embodiment, the passive variable emittance device is adapted to be used as a temperature-controlled optical switch.

According to another broad aspect, there is provided a method for making a passive variable emittance device, comprising: providing a substrate having a receiving surface adapted to reflect radiations having a given wavelength; depositing an intermediary layer on the receiving surface of the substrate, the intermediary layer being substantially transparent to the radiations having the given wavelength; and depositing a thermochromic layer on top of the intermediary layer, the thermochromic layer being substantially transparent to the radiations having the given wavelength for a first temperature below a given transition temperature, and presenting both reflection and absorption for the radiations for a second temperature above the given transition temperature, a total optical thickness for the intermediary and thermochromic layers being substantially equal to one quarter of the given wavelength so that radiations reflected by the thermochromic layer at the second temperature destructively interfere with radiations transmitted by the thermochromic and intermediary layers and reflected by the substrate in order to obtain a first emittance for the passive variable emittance device at the second temperature being greater than a second emittance for the passive variable emittance device at the first temperature.

In one embodiment, the step of depositing a thermochromic layer comprises depositing a thermochromic layer having a physical thickness comprised between about 10 nm and about 80 nm.

In the same or another embodiment, the step of depositing an intermediary layer comprises depositing an intermediary layer having a physical thickness greater than about 1 μm.

In one embodiment, the optical thickness of the thermochromic layer is substantially negligible relative to the optical thickness of the intermediary layer, the physical thickness of the intermediary layer being substantially equal to one quarter of the given wavelength in the intermediary medium.

In one embodiment, the receiving surface of the substrate is adapted to reflect an infrared light, the intermediary layer is made of a material that is substantially transparent to the infrared light, and the thermochromic layer is made of a material that is substantially transparent to the infrared light, when in a semiconductor state, and that both reflects and absorbs the infrared light when in a metallic state.

In one embodiment, the receiving surface of the substrate is made of a material selected from a group consisting of: gold, aluminum, platinum, copper, silver, zinc, and alloys thereof.

In one embodiment, the intermediary layer is made of a material selected from a group consisting of: $SiO_2$, $Al_2O_3$, $MgO$, $Ta_2O_5$, $ZnO$, $ZrO_2$, $TiO_2$, $CaF_2$, $ThF_4$, $Si_3N_4$, Boron Silicate Crown glass BK7, ZnS, and ZnSe.

In one embodiment, the thermochromic layer is made of a material selected from a group consisting of: $VO_2$, $VO_7$, $V_6O_{11}$, $V_2O_3$, $V_5O_9$, $V_6O_{13}$, $VO$, $V_8O_{15}$, $V_2O_5$, $Fe_3O_4$, $NbO_2$, $NiS$, $Ti_2O_3$, $Ti_3O_5$, $Ti_4O_7$, $Ti_5O_9$, $SmNiO_3$, $LaCoO_3$, $NdNiO_3$, and $PrNiO_3$.

In one embodiment, the passive variable emittance device is adapted to be used as a radiator for a satellite.

In another embodiment, the passive variable emittance device is adapted to be used as a temperature-controlled optical switch.

In the below description, the emittance refers to the ratio of the amount of heat radiated by a surface area to the amount of heat radiated by the blackbody at the same temperature.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
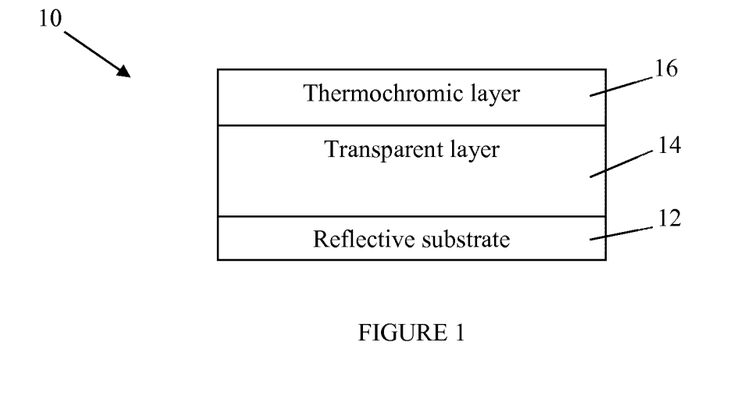
FIG. 1 is a passive variable emittance device, in accordance with an embodiment.

FIG. 1 illustrates one embodiment of a passive variable emittance device 10 comprising three layers 12, 14, and 16. The passive variable emittance device 10 presents an emittance that increases while its temperature increases. As a result, the passive variable emittance device 10 presents a substantially low emittance at substantially low temperatures and a substantially high emittance at substantially high temperatures.

The layer 12 comprises a reflecting substrate adapted to reflect radiations having a given wavelength in vacuum. The reflecting substrate 12 can comprise a single layer made of a reflective material adapted to reflect the radiations having the given wavelength in vacuum. Alternatively, the reflecting substrate 12 can comprise two layers, i.e. a first layer made of a non-reflective material and a second layer deposited on top of the first layer and made of a reflective material adapted to reflect the radiations having the given wavelength in vacuum. It should be understood that in the following description, the term "wavelength" refers to a wavelength in vacuum unless identified differently. The layer 14 is deposited on a receiving surface of the reflecting substrate 12 and is made of a material that is substantially transparent to the radiations having the given wavelength. The layer 16 is deposited on the substantially transparent layer 14 so that the substantially transparent layer 14 is sandwiched between the reflecting substrate 12 and the layer 16. The layer 16 is made of a thermochromic material that presents a reversible semiconductor-to-metal transition when the temperature is increased, and reversible metal-to-semiconductor transition when the temperature is decreased. When the temperature of the thermochromic material is below the transition temperature Tt of the thermochromic material, the thermochromic material is in a semiconductor or insulator state while it is in a metallic state when its temperature is above the transition temperature Tt. As a result, the optical and electrical properties of the thermochromic layer 16 vary as a function of the temperature thereof. Particularly, the thermochromic layer 16 is substantially transparent to the radiations having the given wavelength when the temperature of the thermochromic material is below the transition temperature Tt. When the temperature of the thermochromic material is above the transition temperature Tt, the thermochromic material presents both reflection and absorption for the radiations having the given wavelength.

As described below, the physical thicknesses of the transparent layer 14 and the thermochromic layer 16 are chosen so that the passive variable emittance device 10 operates as a reflector for temperatures below the transition temperature Tt, and as a heat emitter, via generation of destructive interferences, for temperatures above the transition temperature Tt.

The physical thickness of the thermochromic layer 16 is chosen so as to be transparent when its temperature is below the transition temperature Tt, and so that both reflection and absorption of radiation by the thermochromic layer 16 occurs when the temperature is above the transition temperature Tt. If the physical thickness of the thermochromic layer 16 is too small, the major part of the incident radiation at high temperature propagates therethrough and is then reflected back by the reflecting substrate 12 through the layers 14 and 16, resulting in a low value of emittance at high temperature. On the other hand, if the physical thickness of the thermochromic layer 13 is too large, the radiation at high temperature is simply reflected by the thermochromic layer 16 and substantially no radiation propagates therethrough, resulting also in a low emittance value at high temperature. In one embodiment, the physical thickness of the thermochromic layer is comprised between about 10 nm and about 80 nm.

In one embodiment, the physical thickness of the thermochromic layer 16 is chosen so that, when the temperature of the thermochromic layer is above the transition temperature Tt, the amount of radiation reflected by the thermochromic layer 16 is substantially equal to the amount of radiation reflected by the reflecting substrate 12 and exiting the passive variable emittance device 10.

Furthermore, the total optical thickness of the transparent layer 14 and the thermochromic layer 16 is chosen so as to be substantially equal to the quarter of the given wavelength of the radiation in vacuum so as to allow the generation of destructive interferences when the temperature of the thermochromic layer 16 is above the transition temperature Tt.

The person skilled in the art will understand the optical thickness of a layer made of a given material is equal to the refractive index of the given material multiplied by the physical thickness of the layer. Similarly, the wavelength of a given radiation propagating in a given material is equal to the wavelength of the radiation in vacuum divided by the refractive index of the material.

In one embodiment, the optical thickness of the thermochromic layer 16 is negligible relative to that of the transparent layer. For example, the optical thickness of the thermochromic layer 16 may be considered as negligible relative to that of the transparent layer when the corresponding physical thickness of the thermochromic layer 16 is about 10 times less than the corresponding physical thickness of the transparent layer. In this case, the optical thickness of the transparent layer 14 may be chosen to be substantially equal to the quarter of the given wavelength of the radiation in vacuum. In other words, the physical thickness of the transparent layer 14 may be chosen to be substantially equal to the quarter of the given wavelength of the radiation in the transparent medium.

In one embodiment, the physical thickness of the transparent layer 14 is greater than about 1 μm.

Figure 2A:
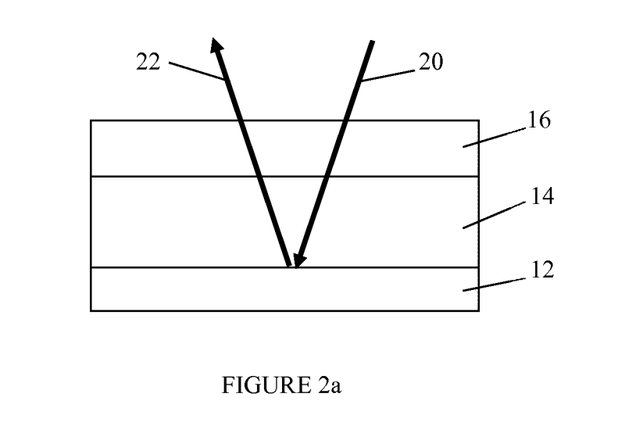
FIG. 2a schematically illustrates an operation principle of the passive variable emittance device of FIG. 1 when at a temperature below a transition temperature.
Figure 2B:
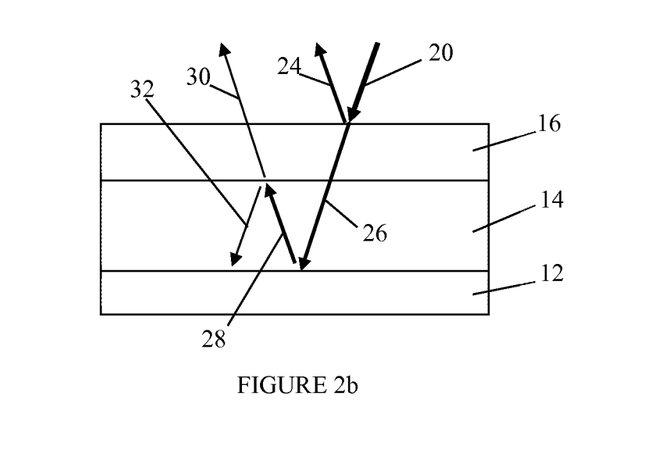
FIG. 2b schematically illustrates an operation principle of the passive variable emittance device of FIG. 1 when at a temperature above a transition temperature.

FIGS. 2a and 2b illustrate the operation principle of the passive variable emittance device 10 when its temperature is below and above the transition temperature Tt, respectively.

When the temperature of the thermochromic layer 16 is below the transition temperature Tt, the thermochromic layer is in its semiconductor state and both the thermochromic layer 16 and the transparent layer 14 are substantially transparent to the radiations having the given wavelength. As a result, by assuming a near-normal incidence, an incident radiation 20 having the given wavelength propagates through the two layers 14 and 16 before reaching the reflecting substrate 12. For example, an incident radiation 20 may be considered as being "near-normal", when the angle between the incident radiation 20 and the normal to the surface of the thermochromic layer 16 is less than about 30 degrees or substantially equal to about 30 degrees. The incident radiation 20 is then reflected, thereby generating the reflected radiation 22 which propagates through the transparent and thermochromic layers 14 and 16 in order to exit the passive variable emittance device 10. As a result, most of the incident radiation is reflected by the passive variable emittance device 10.

When the temperature of the thermochromic layer 16 is above the transition temperature Tt, i.e. when the thermochromic material is in the metallic state, the thermochromic layer 16 both reflects and propagates radiation. As illustrated in FIG. 2b, an incident radiation 20 having a "near-normal incidence" is divided into a reflected radiation 24 and a propagating radiation 26 that propagates through the thermochromic layer 16 and the transparent layer 14. It should be understood that some of the propagating radiation is absorbed by the thermochromic material. The radiation 26 is reflected back by the reflecting substrate 12 and the reflected radiation 28 propagates through the transparent layer 14 towards the thermochromic layer 16. A first part of the reflected radiation 28 is reflected at the interface between the transparent layer 14 and the thermochromic layer 16 and propagates back towards the reflecting substrate 12. The second part of the reflected radiation 28 propagates through the thermochromic layer 16 and exits the passive variable emittance device 10. It should be understood that further internal reflections of the radiation may occur, and for each reflection at the interface between the transparent and thermochromic layers some radiation propagates through the thermochromic layer 16 and exits the passive variable emittance device 10. The radiation is substantially attenuated on each reflection.

Since the total optical thickness of the transparent and thermochromic layers 14 and 16 is substantially equal to about the quarter of the given wavelength of the radiation, the radiation 30 experiences a phase shift of about $\pi$ with respect to the radiation 24 reflected by the thermochromic layer 16. As a result, the phase difference between the radiation 24 reflected by the thermochromic layer 16 and the radiation 30 reflected by the reflecting substrate 12 is substantially equal to about $\pi$, and the radiations 24 and 30 substantially and destructively interfere together, resulting in a substantially low reflectance value and a substantially high emittance value for the passive variable emittance device 10.

In an embodiment in which the physical thickness of the thermochromic layer 16 is chosen so that the amount of radiation reflected by the thermochromic layer 16 is substantially equal to the amount of radiation reflected by the reflecting substrate 12 and exiting the passive variable emittance device 10, when the temperature is above the transition temperature Tt, substantially no radiation having the given wavelength is reflected by the passive variable emittance device 10.

While in the present description, it is referred to a given wavelength for the radiation, the person skilled in the art will understand that the passive variable emittance device 10 is adapted to selectively reflect radiations having a wavelength included in a wavelength band containing the given wavelength and emit heat. In one embodiment, the wavelength band is substantially centered on the given wavelength.

In one embodiment, the passive variable emittance device 10 is designed for selectively reflecting infrared radiations or light and emitting heat. In this case, the reflecting substrate 12 is made of a material adapted to reflect infrared light, the transparent layer is made of a material that is substantially transparent to infrared light, and the thermochromic layer 16 is made of a material that is substantially transparent to infrared light, when in its semiconductor state, and that both reflects and absorbs infrared light when in its metallic state.

In this case, the reflecting substrate 12 may be made of a metallic material such as gold, aluminum, platinum, copper, silver, zinc, alloys thereof, or the like. In another embodiment, the reflecting substrate may be made of a non-reflecting material having a reflecting coating thereon.

The transparent layer 14 may be made from a dielectric material transparent to infrared light. Oxides such as $SiO_2$, $Al_2O_3$, $MgO$, $Ta_2O_5$, $ZnO$, $ZrO_2$, $TiO_2$, or the like may be used. In another example, fluorides such as $CaF_2$, $ThF_4$, or the like may be used. In a further example, nitrides such as $Si_3N_4$, or any other adequate dielectric material such as Boron Silicate Crown glass BK7, ZnS, ZnSe, void, or the like may be used.

In one embodiment, the thermochromic layer 12 is made from vanadium dioxide $VO_2$. It should be understood that the vanadium dioxide may be crystalline or polycrystalline. Vanadium dioxide exhibits one of the largest observed variations in the electrical and optical properties due to a reversible semiconductor-to-metal transition that occurs at a transition temperature Tt of about 68° C., which is close to room temperature. From an optical point of view, vanadium dioxide presents a good transparency to infrared radiation in the semiconductor (or insulator) state, and both its absorption and reflection are increased by increasing the temperature above Tt. Moreover, the transition temperature Tt of vanadium dioxide can be lowered through doping with donors, such as W or Mo, or raised through doping with acceptors, such as Ti or Al. BY adequately choosing an appropriate dopant and its quantity, it is possible to obtain a precise control of the transition temperature Tt, for instance around room temperature.

In another embodiment, the thermochromic layer may be made of a material such as $V_4O_7$, $V_6O_{11}$, $V_2O_3$, $V_5O_9$, $V_6O_{13}$, $VO$, $V_8O_{15}$, $V_2O_5$, $Fe_3O_4$, $NbO_2$, $NiS$, $Ti_2O_3$, $Ti_3O_5$, $Ti_4O_7$, $Ti_5O_9$, $SmNiO_3$, $LaCoO_3$, $NdNiO_3$, $PrNiO_3$, or the like.

In one embodiment, the passive variable emittance device 10 comprises a layer of $SiO_2$ having a physical thickness greater than about 1 µm and a layer of vanadium dioxide having a physical thickness comprised between about 10 nm and about 80 nm.

In one embodiment, the passive variable emittance device 10 is used as a radiator for satellites. In this case, the layers characteristics may be chosen to obtain the interferences in the thermochromic metallic state for a given range of wavelengths in the mid-infrared range, around the maximum of the blackbody at a desired operating temperature for the components of the satellite, e.g. room temperature. For example, the range of wavelength may be centered around about 7.7 µm, which corresponds to the maximum of the blackbody at 100° C. In this case, the optical thickness of the thermochromic layer 16 may be negligible with respect to that of the transparent layer 14 made of $CaF_2$ for example, which may be substantially equal to about 1.925 µm (=7.7 µm/4). The corresponding physical thickness of $CaF_2$ may be substantially equal to about 1.426 µm (=1.925 µm/$n_{CaF_2}$, with $n_{CaF_2}$=1.35).

In another embodiment, the passive variable emittance device 10 is used as a temperature-controlled switch. An incident light beam having a given wavelength is propagated on the thermochromic layer 16 of the passive variable emittance device 10. When the temperature of the thermochromic layer 16 is below the transition temperature Tt, the incident light beam propagates through the transparent and thermochromic layers 14 and 16 before being reflected by the reflecting layer 12 and propagating back through the transparent and thermochromic layers 14 and 16. The incident light beam is then reflected by the passive variable emittance device 10. When the temperature of the thermochromic layer 16 is increased above the transition temperature Tt, destructive interferences occurs, as explained above, and substantially no light beam is reflected by the passive variable emittance device 10.

Figure 3A:
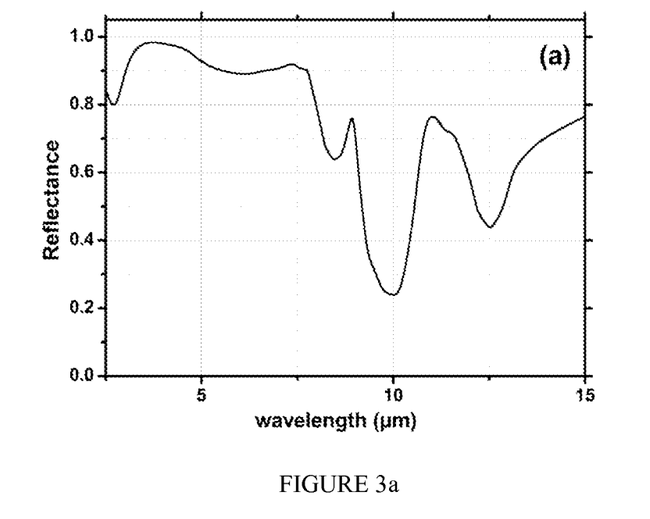
FIG. 3a is a graph of a reflectance as a function of wavelength for a simulated passive variable emittance device operated at a temperature below a transition temperature.

FIGS. 3a illustrates the simulated reflectance for a passive variable emittance device comprising a 20 nm physical thickness $VO_2$ thermochromic layer and a 1300 nm physical thickness $SiO_2$ transparent layer on a gold substrate, for a temperature below the transition temperature Tt. One can note that the reflectance is high (i.e. >about 0.6) over a wide range (i.e. from about 2.5 µm to about 15 µm) of infrared wavelengths, except for some absorption bands of $SiO_2$ such as a first band at about 2.5 µm to about 4 µm, a second band at about 8 µm to about 8.5 µm, a third band at about 9 µm to about 10 µm, and a fourth band around about 12.5 µm.

Figure 3B:
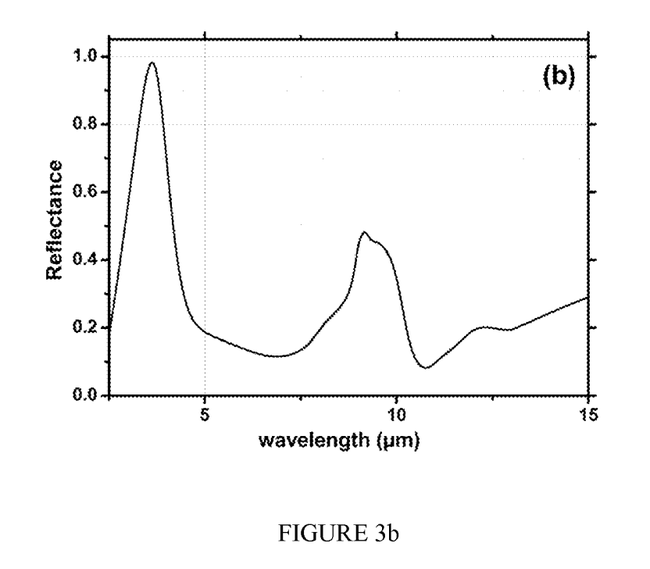
FIG. 3b is a graph of a reflectance as a function of wavelength for the simulated passive variable emittance device of FIG. 3a operated at a temperature above a transition temperature.

FIG. 3b illustrates the simulated reflectance for the passive variable emittance device of FIG. 3a and for a temperature greater than the transition temperature Tt of the thermochromic layer. One can note that the reflectance is considerably decreased over a wide range of infrared wavelengths with respect to that of FIG. 3a.

The skilled person will understand that if the physical thickness of the $VO_2$ layer is too small, the major part of the incident radiation at high temperature will pass through the $VO_2$ film and be then reflected back by the substrate. In this case, the interference effect will be too small to achieve high emittance values at high temperature. The optimal physical thickness of the VO2 layer should be experimentally determined, depending on the properties of the VO2 film, such as its density and its roughness for example.

A further increase in the physical thickness of the VO2 layer will increase the absorption effect of the device to the detriment of the interference effect. In fact, for thicker VO2 film, the radiation transmitted through the thin VO2 thermochromic layer is attenuated and then reflected by the back infrared high-reflecting substrate. The reflected radiation is further attenuated while propagating through the VO2 layer after being reflected by the reflecting substrate.

Therefore, a further increase in the physical thickness of the VO2 layer will increase its reflectivity at high temperature and completely suppress the transmittance, resulting in a decrease of the emittance for the passive variable emittance device with increasing the temperature, which is a common behavior for VO2 films deposited on infrared low-reflecting substrates, namely high emittance at low temperature, and low emittance at high temperature. In this case, the passive variable emittance device is no longer suitable for radiator applications.

The passive variable emittance device 10 may be made using any adequate fabrication technique. A reflective substrate 12 adapted to reflect radiations having a given wavelength is provided. The reflecting substrate 12 has a receiving surface on which a transparent layer 14 made of a material substantially transparent to the given wavelength is deposited. Then a thermochromic layer 16 is deposited on top of the transparent layer 14 so that the transparent layer be sandwiched between the reflecting substrate 12 and the thermochromic layer 16.

The following presents one exemplary experimental method for depositing a VO2 thermochromic layer on a substrate.

The substrates used for the optimization of the electrical and optical VO2 properties are: silicon wafers, SiP2/Si, and quartz. The substrates are cleaned ultrasonically successively in acetone, isopropyl alcohol (IPA), methanol, and deionized water and then dried under N2 flow.

Figure 4:
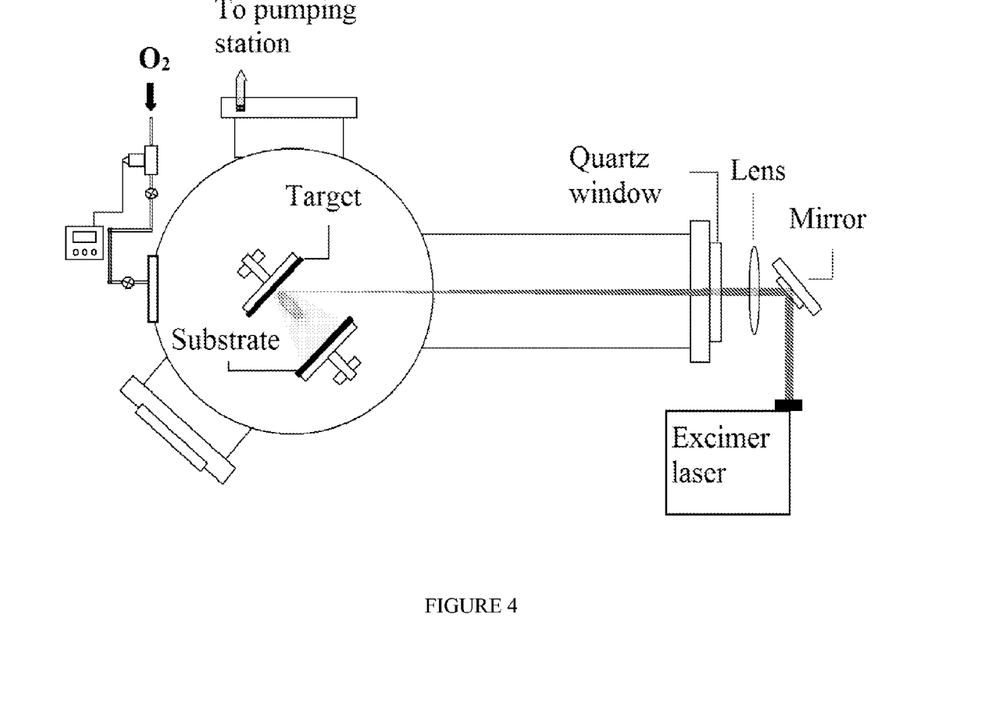
FIG. 4 is a schematic illustration of a pulsed laser deposition setup, in accordance with an embodiment.

FIG. 4 illustrates a schematic of a Pulsed Laser Deposition (PLD) setup used for depositing the different layers on the substrates. The PLD vacuum chamber is evacuated to about $10^{-6}$ Torr at room temperature.

The vanadium target is then cleaned using KrF excimer laser ($\lambda$=about 248 nm) at a laser energy density of about 2 J/cm2 with an impulse frequency of about 10 Hz under vacuum at room temperature.

For a substrate temperature higher than about 400° C., KrF excimer laser is used to deposit vanadium dioxide (VO2) films on the Si, SiO2/Si and quartz substrates at a laser energy density of about 2 J/cm2 under an O2 pressure from about 2 mTorr to about 25 mTorr (about 2, about 5, about 10, about 15, about 20, and about 25 mTorr) with an impulse frequency of about 10 Hz. The distance between the target and the substrate is kept at about 6.5 cm. At the end of the pulsed laser ablation process, the samples are cooled down to room temperature.

Figure 5:
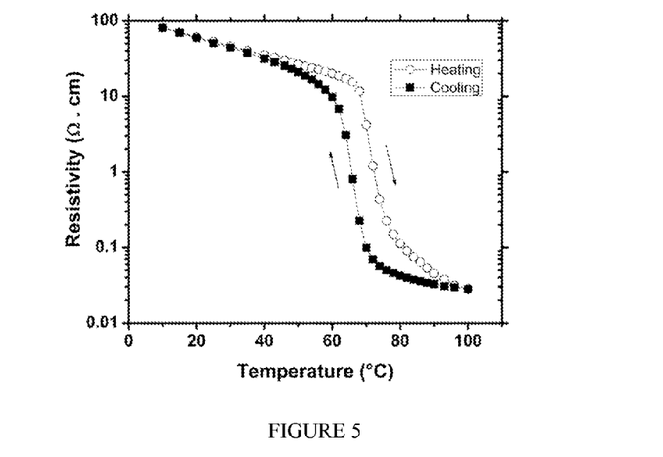
FIG. 5 is an exemplary graph of a resistivity of a $VO_2$ film as a function of temperature.

The microstructure of the VO2 thin films deposited using reactive pulsed laser deposition (RPLD) using vanadium target was confirmed by X-ray diffraction (XRD) for all the aforementioned O2 pressures. However, the resistivity measurements carried out using conventional four-point probe method revealed that the best resistivity switch is observed for the VO2 film deposited under a pressure of about 15 mTorr of O2. In fact, the VO2 film deposited under about 15 mTorr of O2 presents a drop in the resistivity of about 3.4 orders of magnitude when the VO2 switches to the metallic state, as illustrated in FIG. 5.

Figure 6:
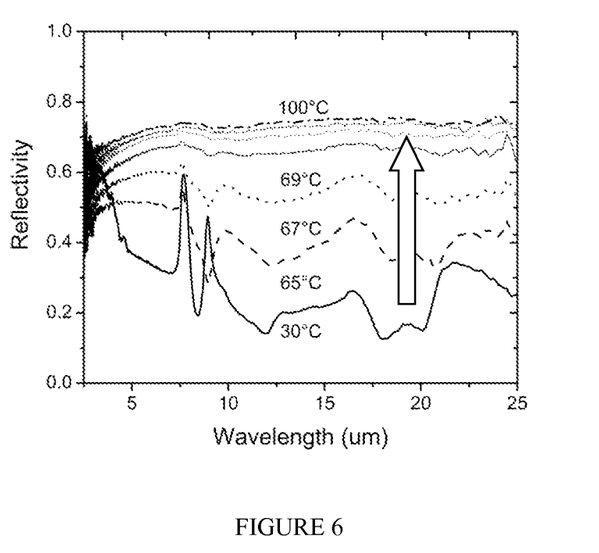
FIG. 6 is an exemplary graph of a reflectivity of a $VO_2$ film as a function of wavelength for different temperatures.

Reflectivity measurements in the mid-infrared range were carried out to identify the optical switching properties across the metal-to-insulator transition for an about 220 nm physical thickness VO2 film deposited on a quartz substrate at about 15 mTorr O2. As illustrated in FIG. 6, the spectral reflectivity of the film shows an important variation across the metal-to-insulator transition temperature (TMIT) in the mid-infrared range.

While in the above description PLD is used for the deposition of a VO2 film, it should be understood that other adequate deposition techniques may be used. For example, sputtering or sol-gel methods may be used for depositing the VO2 film.

In the following, an exemplary method for fabricating a passive variable emittance device 10 is presented.

The substrates used for the fabrication of the passive variable emittance device 10 are: (1) sputter deposited Au/quartz, (2) sputter deposited Al/quartz substrates and (3) bulk Al substrates.

The expression "sputter deposited" refers to a layer deposited using sputtering method. At least I some instances, the sputtering method presents the advantage of homogeneity of the deposited films over large surface area substrates, which may be of interest for industrial production. Moreover, the deposition rates of metallic films are relatively high. Both quartz and Al substrates are cleaned according to the above-mentioned cleaning procedure.

In the present example, any adequate infrared-high reflecting material can be used as a substrate (such as gold, aluminum, copper, platinum, or the like), either as a bulk material or as a thin film.

SiO2 films were prepared using Plasma Enhanced Chemical Vapor Deposition (PECVD) from a mixture of SiH4 (about 8.5 sccm)/N2O (about 710 sccm)/N2 (about 161.5 sccm). The process was conducted at a substrate temperature of about 390° C. under a pressure of about 500 mTorr with an RF power of about 50 watts.

It should be understood that other deposition methods such as PLD or sputtering may be used for depositing the SiO2 film on the substrate.

The above-described optimized PLD process, including chamber conditioning, target cleaning and VO2 deposition, was used to deposit the very-thin VO2 thermochromic film. The deposition time was adjusted to get the desired VO2 film physical thicknesses.

In order to verify experimentally the operation of the device, infrared high-reflecting films of Au and Al were used as substrates. Amorphous SiO2 and polycrystalline VO2 layers were used as the infrared-transparent and the thermochromic layers, respectively. Two series of samples were prepared: the first one consisted of samples with the same physical thickness of the SiO2 (about 1340 nm) layer and with various VO2 layer physical thicknesses (about 10, about 20, about 30, about 40, about 50, about 60, about 80, and about 100 nm), while the second one consisted of samples with the same VO2 layer physical thickness (about 30 nm) and various SiO2 layer physical thicknesses (about 460, about 720, about 1030, about 1360, and about 1570 nm).

In order to properly describe the operation of the passive variable emittance device 10 as a radiator, the emittance of the different devices was computed from reflectance measurements. In fact, the emittance can be obtained by measuring the reflectance of the device. According to Kirchhoff's Law, the spectral emittance $\in_\lambda$ and spectral absorptance $\alpha_\lambda$ of a body are equal at any specified temperature and wavelength at thermal equilibrium conditions. From this: $\epsilon_\lambda = \alpha_\lambda$. Therefore, $\epsilon_\lambda$ of an opaque material can be expressed as:

$$\epsilon_\lambda = 1 - \rho_\lambda \quad (1)$$

with $\rho_\lambda$ being the spectral total reflectance (including the specular and the diffuse components of the reflectance).

The emittance versus temperature was then calculated using the relation:

$$\varepsilon = \frac{\int_{\lambda_1}^{\lambda_2} \epsilon_\lambda(T) P(\lambda, T) d\lambda}{\int_{\lambda_1}^{\lambda_2} P(\lambda, T) d\lambda} \quad (2)$$

where $\epsilon_\lambda(T)$ is the spectral emittance and $P(\lambda, T)$ is the radiation of a blackbody at temperature T given by Planck's function for the given wavelength and temperature, $$P(\lambda, T) = 2\pi hc^2 / [\lambda^5 (e^{hc/k\lambda T} - 1)] \quad (3)$$

Figure 7A:
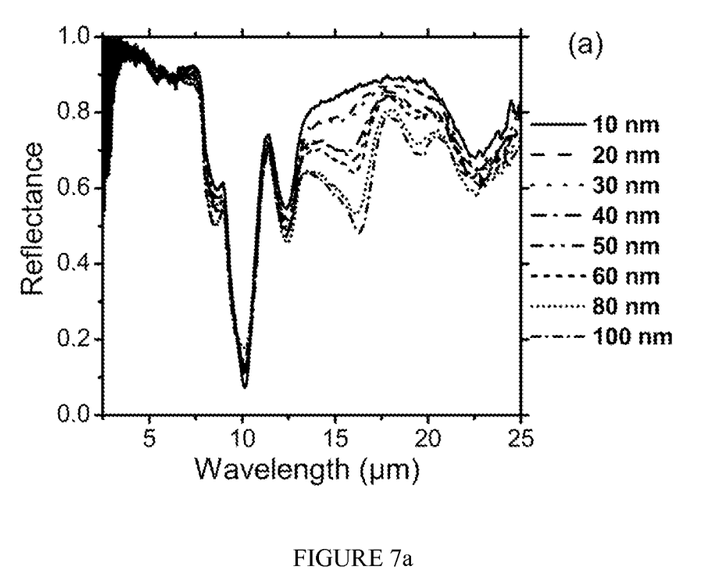
FIG. 7a is an exemplary graph of a reflectance of a passive variable emittance device comprising a 1340 nm physical thickness $SiO_2$ layer as a function of wavelength for different $VO_2$ layer physical thicknesses and for a temperature below a transition temperature.
Figure 7B:
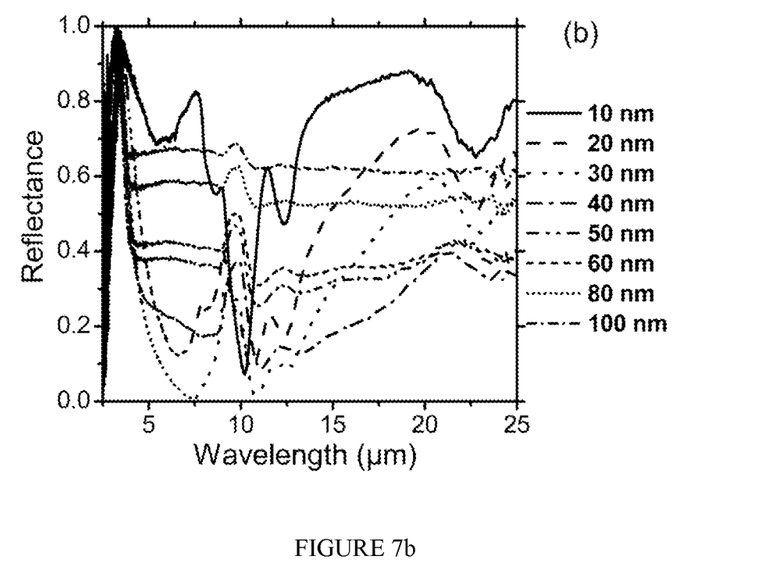
FIG. 7b is an exemplary graph of a reflectance of the passive variable emittance device of FIG. 7a as a function of wavelength for different $VO_2$ layer physical thicknesses and for a temperature above a transition temperature.

The total reflectance of the devices for different VO2 layer physical thicknesses at low (about 25° C.) and high temperature (about 100° C.) is given in the graph illustrated at FIG. 7a and FIG. 7b, respectively. The corresponding emittance values and the tunability of the emittance are presented in FIG. 8 as a function of the physical thickness.

Figure 8:
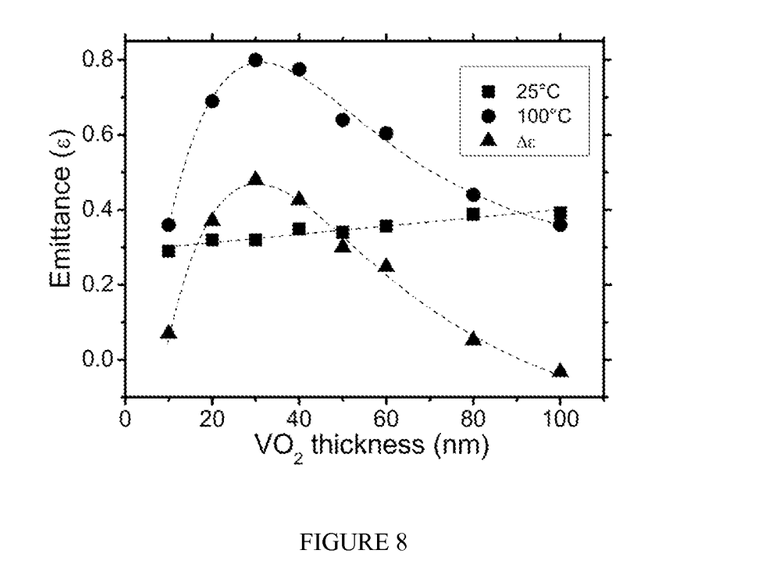
FIG. 8 is an exemplary graph of an emittance of a passive variable emittance device comprising a 1340 nm physical thickness $SiO_2$ layer as a function of a physical thickness of a $VO_2$ layer for temperatures above and below the transition temperature of $VO_2$ as well as the corresponding tunability of the emittance (i.e. the emittance above the transition temperature minus the emittance below the transition temperature)

The low temperature reflectance of the device slightly decreases while increasing the VO2 layer physical thickness from about 10 to about 100 nm, due to an increase in the absorption of the IR radiation for thicker VO2 layers (see FIG. 7a). As a result, the corresponding low temperature emittance increases, as illustrated in FIG. 8. However, major changes occur in the reflectance at high temperature while increasing the physical thickness of the VO2 layer. As illustrated in FIG. 7b, the aforementioned destructive interference of the reflectance is clearly observed for a VO2 physical thickness ranging from about 10 nm to about 40 nm. However, when the physical thickness of the VO2 layer is approximately about 50 nm, the destructive interference of the reflectance is no longer observed and the low reflectance values are mainly due to the abovementioned absorption effect. Further increase of the VO2 physical thickness results in a progressive increase of the reflectance.

According to these results, one can observe that interesting emittance performances are obtained in the range about 20 nm-about 40 nm for the VO2 physical thickness, corresponding to the range of VO2 physical thicknesses where the interference effect is dominant. The most interesting emittance performance in terms of both high emittance values at high temperature and tunability is observed for a VO2 physical thickness of about 30 nm, for which a near zero reflectance is observed in the infrared range.

Two observations regarding the determination of the optimal physical thickness of the VO2 layer, for which a high emittance performance of the passive variable emittance device is achieved, may be considered:

First, if the VO2 layer is rough, an effective mixing of the VO2 with air (or void) over a certain depth is obtained. The physical thickness of the rough VO2 layer may be increased to get the same emittance performance as the one of a device using an optimal physical thickness of a smooth VO2 layer.

Second, the effective mixing of the VO2 layer with void is also obtained in the case of a layer with low density. In this case, it may also be necessary to increase the physical thickness of the porous VO2 layer to get the same emittance performance as the one of a passive variable emittance device using an optimal physical thickness of a dense VO2 layer.

Figure 9A:
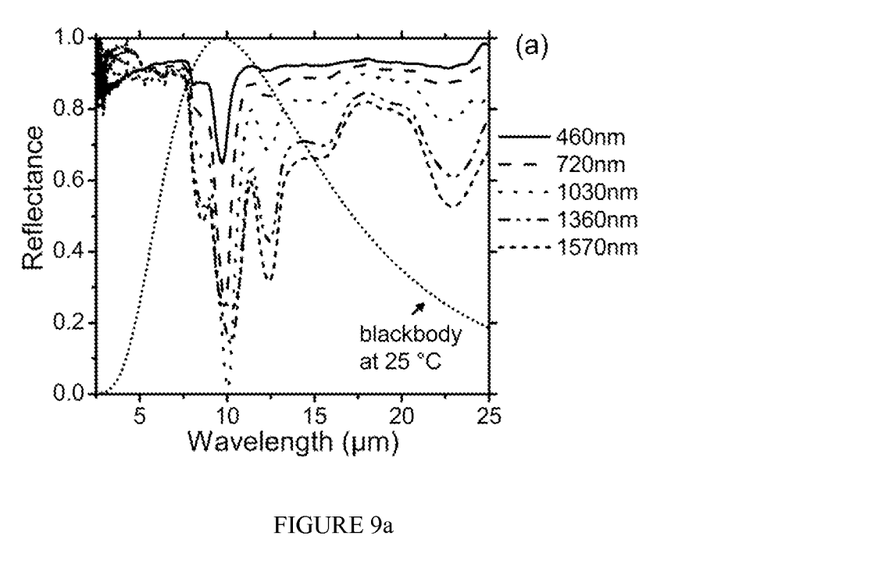
FIG. 9a is an exemplary graph of a reflectance of a passive variable emittance device comprising a 30 nm physical thickness $VO_2$ layer as a function of wavelength for different transparent $SiO_2$ layer physical thicknesses and for a temperature below a transition temperature.

FIG. 9a illustrates the effect of changing the physical thickness of the infrared-transparent SiO2 layer at low temperature. It should be noted that the increase in the SiO2 layer physical thickness is accompanied with a slight increase of the absorption of the infrared radiation.

Figure 9B:
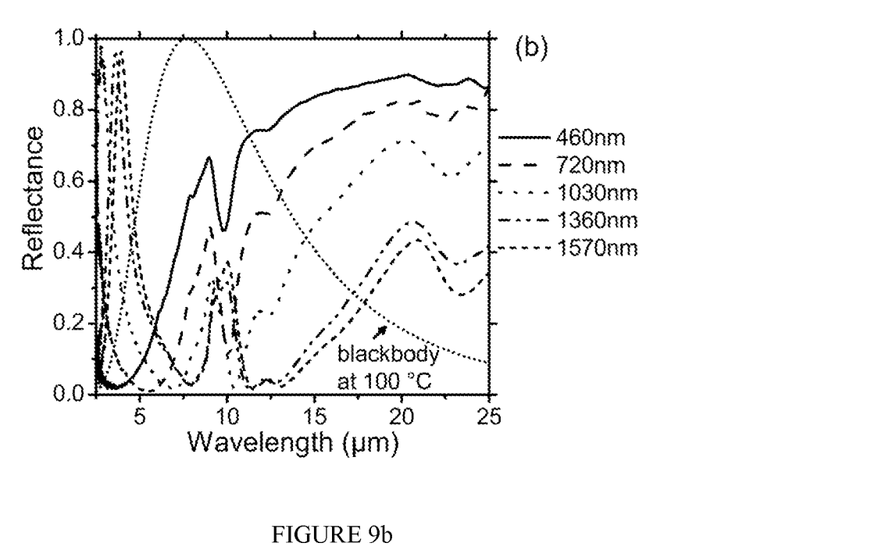
FIG. 9b is an exemplary graph of a passive variable emittance device comprising a 30 nm physical thickness $VO_2$ layer as a function of wavelength for different transparent $SiO_2$ layer physical thicknesses and for a temperature above a transition temperature.
Figure 10:
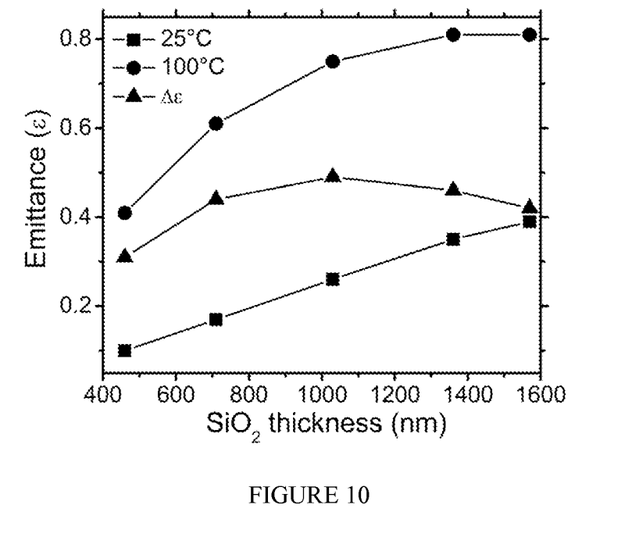
FIG. 10 is an exemplary graph of an emittance of a passive variable emittance device comprising a 30 nm physical thickness $VO_2$ layer as a function of a physical thickness of a transparent $SiO_2$ layer for temperatures above and below the transition temperature of $VO_2$ as well as the corresponding tunability of the emittance (i.e. the emittance above the transition temperature minus the emittance below the transition temperature)

FIG. 9b illustrates the effect of changing the physical thickness of the infrared-transparent SiO2 layer on the position destructive interference of the reflectance at about 100° C. for the optimal VO2 thin film physical thickness, i.e. about 30 nm. The increase of the physical thickness of the SiO2 layer shifts the destructive interference peak towards the longest wavelengths. Moreover, the destructive interference becomes broader, so that lower reflectance is obtained over wide range of wavelengths, which results in an increase of the emittance at high temperature for the optimal physical thickness of SiO2. The optimal physical thickness of the infrared-transparent layer can be determined to get optimal emittance performance in terms of large tunability and high emittance at high temperature averaged with the blackbody radiation. The most interesting performances of the device in terms of emittance at high temperature as well as the tunability are achieved for SiO2 physical thickness≥about 1 µm, as illustrated in FIG. 10.

Figure 11:
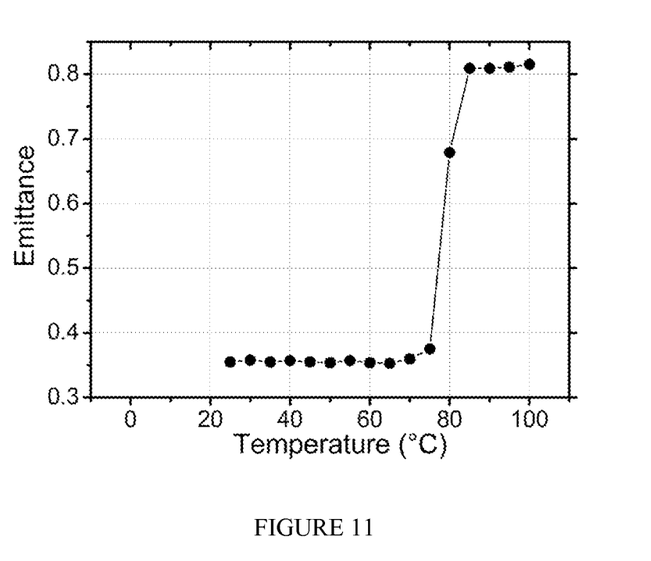
FIG. 11 is an exemplary graph of an emittance of a passive variable emittance device comprising a 30 nm physical thickness $VO_2$ layer and a 1360 nm physical thickness $SiO_2$ layer as a function of the temperature.

The evolution of the emittance of the passive variable emittance device comprising an about 30 nm physical thickness VO2 layer and an about 1360 nm physical thickness SiO2 layer as a function of the temperature is given in FIG. 11. The emittance for the device passes from 0.35 to 0.81 with increasing the temperature. A modulation of about 0.46 is therefore achieved.

Figure 12:
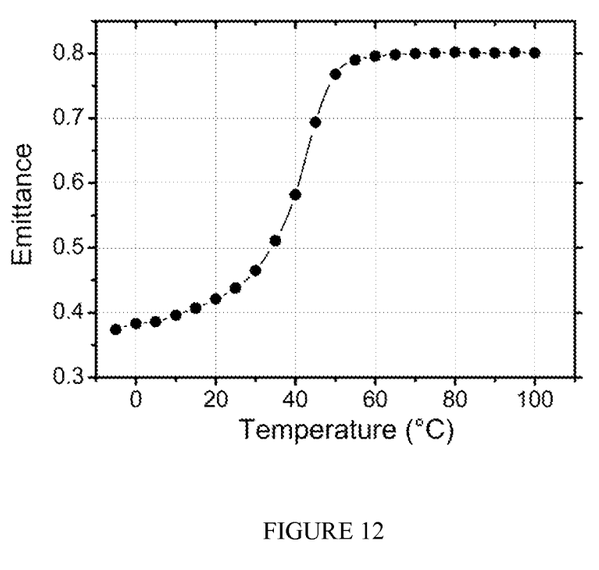
FIG. 12 is an exemplary graph of an emittance of a passive variable emittance device comprising a 2.5% tungsten-doped $VO_2$ layer with a physical thickness of about 30 nm and a $SiO_2$ layer with a physical thickness of about 1360 nm as a function of the temperature.

In one embodiment, for an optimum operation of the disclosed device as a thermal regulating system, the transition temperature Tt should be ideally around room temperature, and more preferably, the transition should be tailored over a wide range on temperatures. This can be achieved for the case of VO2 through doping with donors. In order to demonstrate this concept for our device, we used about 2.5% tungsten-doped VO2 as the thermochromic layer instead of pure or undoped VO2. The emittance performance with the temperature is illustrated in FIG. 12. The temperature of the operation of the device was reduced and the transition was tailored over a wide range of temperature (from about −5 to about 65° C.). The modulation depth in the emittance is about 0.43 with the values of about 0.37 and about 0.80 at low (about −5° C.) and high (>about 65° C.) temperature, respectively. Higher tungsten content would allow getting a transition centered around room temperature.

In one embodiment, the present passive variable emittance device is simpler and easier to be experimentally achieved than the conventional methods used for the regulation of the internal temperature of satellites.

The operation of the present passive variable emittance device is based on the passive transition of the thermochromic material, so that there is no need for additional power as for the electrochromic transition for example.

In one embodiment, the present passive variable emittance device presents higher emittance performance as compared to conventional passive tunable emittance coatings, especially in terms of emittance at high temperature and tunability, as demonstrated experimentally.

In one embodiment, the present passive variable emittance device is lightweight since it is based on thin films technology (<about 10 g/m$^2$).

In one embodiment, the present passive variable emittance device can be substantially easily integrated onto a satellite since it is compatible with Aluminum surfaces and Optical Solar Reflectors.

In one embodiment, the present passive variable emittance device is substantially robust since no moving parts are required.

The embodiments of the invention described above are intended to be exemplary only. The scope of the invention is therefore intended to be limited solely by the scope of the appended claims.

The invention claimed is:

1. A passive variable emittance device comprising:
   a substrate having a receiving surface adapted to reflect radiations having a given wavelength;
   an intermediary layer deposited on the receiving surface of the substrate and being substantially transparent to the radiations having the given wavelength; and
   a thermochromic layer deposited on top of the intermediary layer, the thermochromic layer being substantially transparent to the radiations having the given wavelength for a first temperature below a given transition temperature, and presenting both reflection and absorption for the radiations for a second temperature above the given transition temperature,
   a total optical thickness for the intermediary and thermochromic layers being substantially equal to one quarter of the given wavelength so that radiations reflected by the thermochromic layer at the second temperature destructively interfere with radiations transmitted by the thermochromic and intermediary layers and reflected by the substrate in order to obtain a first emittance for the passive variable emittance device at the second temperature being greater than a second emittance for the passive variable emittance device at the first temperature.

2. The passive variable emittance device of claim 1, wherein a physical thickness of the thermochromic layer is comprised between about 10 nm and about 80 nm.

3. The passive variable emittance device of claim 2, wherein a physical thickness of the intermediary layer is greater than about 1 μm.

4. The passive variable emittance device of claim 1, wherein an optical thickness of the thermochromic layer is substantially negligible relative to an optical thickness of the intermediary layer, a physical thickness of the intermediary layer being substantially equal to one quarter of the given wavelength in the intermediary medium.

5. The passive emittance device of claim 4, wherein the receiving surface of the substrate is adapted to reflect an infrared light, the intermediary layer is made of a material that is substantially transparent to the infrared light, and the thermochromic layer is made of a material that is substantially transparent to the infrared light, when in a semiconductor state, and that both reflects and absorbs the infrared light when in a metallic state.

6. The passive variable emittance device of claim 5, wherein the receiving surface of the substrate is made of a material selected from a group consisting of: gold, aluminum, platinum, copper, silver, zinc, and alloys thereof.

7. The passive variable emittance device of claim 5, wherein the intermediary layer is made of a material selected from a group consisting of: SiO2, Al2O3, MgO, Ta2O5, ZnO, ZrO2, TiO2, CaF2, ThF4, Si3N4, Boron Silicate Crown glass BK7, ZnS, and ZnSe.

8. The passive variable emittance device of claim 5, wherein the thermochromic layer is made of a material selected from a group consisting of: VO2, V4O7, V6O11, V2O3, V5O9, V6O13, VO, V8O15, V2O5, Fe3O4, NbO2, NiS, Ti2O3, Ti3O5, Ti4O7, Ti5O9, SmNiO3, LaCoO3, NdNiO3, and PrNiO3.

9. The passive variable emittance device of claim 1, wherein the passive variable emittance device is adapted to be used as a radiator for a satellite.

10. The passive variable emittance device of claim 1, wherein the passive variable emittance device is adapted to be used as a temperature-controlled optical switch.

11. A method for making a passive variable emittance device, comprising:
    providing a substrate having a receiving surface adapted to reflect radiations having a given wavelength;
    depositing an intermediary layer on the receiving surface of the substrate, the intermediary layer being substantially transparent to the radiations having the given wavelength; and
    depositing a thermochromic layer on top of the intermediary layer, the thermochromic layer being substantially transparent to the radiations having the given wavelength for a first temperature below a given transition temperature, and presenting both reflection and absorption for the radiations for a second temperature above the given transition temperature,
    a total optical thickness for the intermediary and thermochromic layers being substantially equal to one quarter of the given wavelength so that radiations reflected by the thermochromic layer at the second temperature destructively interfere with radiations transmitted by the thermochromic and intermediary layers and reflected by the substrate in order to obtain a first emittance for the passive variable emittance device at the second temperature being greater than a second emittance for the passive variable emittance device at the first temperature.

12. The method of claim 11, wherein said depositing a thermochromic layer comprises depositing a thermochromic layer having a physical thickness comprised between about 10 nm and about 80 nm.

13. The method of claim 12, wherein said depositing an intermediary layer comprises depositing an intermediary layer having a physical thickness greater than about 1 μm.

14. The method of claim 11, wherein an optical thickness of the thermochromic layer is substantially negligible relative to an optical thickness of the intermediary layer, a physical thickness of the intermediary layer being substantially equal to one quarter of the given wavelength in the intermediary medium.

15. The method of claim 11, wherein the receiving surface of the substrate is adapted to reflect an infrared light, the intermediary layer is made of a material that is substantially transparent to the infrared light, and the thermochromic layer is made of a material that is substantially transparent to the infrared light, when in a semiconductor state, and that both reflects and absorbs the infrared light when in a metallic state.

16. The method of claim 15, wherein the receiving surface of the substrate is made of a material selected from a group consisting of: gold, aluminum, platinum, copper, silver, zinc, and alloys thereof.

17. The method of claim 15, wherein the intermediary layer is made of a material selected from a group consisting of: SiO2, Al2O3, MgO, Ta2O5, ZnO, ZrO2, TiO2, CaF2, ThF4, Si3N4, Boron Silicate Crown glass BK7, ZnS, and ZnSe.

18. The method of claim 15, wherein the thermochromic layer is made of a material selected from a group consisting of: VO2, V4O7, V6O11, V2O3, V5O9, V6O13, VO, V8O15, V2O5, Fe3O4, NbO2, NiS, Ti2O3, Ti3O5, Ti4O7, Ti5O9, SmNiO3, LaCoO3, NdNiO3, and PrNiO3.

19. The method of claim 11, wherein the passive variable emittance device is adapted to be used as a radiator for a satellite.

20. The method of claim 11, wherein the passive variable emittance device is adapted to be used as a temperature-controlled optical switch.

\* \* \* \* \*